US005255855A

United States Patent [19]

Maier et al.

[11] Patent Number: 5,255,855

[45] Date of Patent: Oct. 26, 1993

[54] PLASTICALLY DEFORMED ARMATURE GUIDE PROTRUSIONS

[75] Inventors: Stefan Maier, Schwieberdingen; Jochen Hommel, Leonberg, both of Fed. Rep. of Germany

[73] Assignee: Robert Bosch GmbH, Stuttgart, Fed. Rep. of Germany

[21] Appl. No.: 978,012

[22] Filed: Nov. 18, 1992

[30] Foreign Application Priority Data

Nov. 19, 1991 [DE] Fed. Rep. of Germany ....... 4137994

[51] Int. Cl.[5] ....................... F02M 51/06; F16K 31/02

[52] U.S. Cl. ............................. 239/585.4; 239/533.11; 239/585.1; 239/900; 251/129.15

[58] Field of Search ............. 239/533.11, 585.1, 585.4, 239/600, 900; 251/129.15

[56] References Cited

U.S. PATENT DOCUMENTS

| | | | |
|---|---|---|---|
| 3,434,667 | 3/1969 | Chmura | 239/533.11 |
| 4,646,974 | 3/1987 | Sofianek et al. | 239/900 X |
| 4,662,567 | 5/1987 | Knapp | 239/900 X |
| 4,984,744 | 1/1991 | Babitzka et al. | 239/585.4 |
| 5,143,301 | 9/1992 | Reiter et al. | 239/585.4 |
| 5,178,362 | 1/1993 | Vogt et al. | 239/585.1 |

FOREIGN PATENT DOCUMENTS

| | | | |
|---|---|---|---|
| 3925212 | 1/1991 | Fed. Rep. of Germany . | |
| 4026531 | 2/1992 | Fed. Rep. of Germany . | |
| 9105951 | 5/1991 | World Int. Prop. O. | 239/900 |
| 9117356 | 11/1991 | World Int. Prop. O. | 239/900 |

*Primary Examiner*—Andres Kashnikow
*Assistant Examiner*—William Grant
*Attorney, Agent, or Firm*—Edwin E. Greigg; Ronald E. Greigg

[57] ABSTRACT

An injection valve, having a valve closing member comprising an armature and a valve closing body, disposed within a nozzle holder. The nozzle holder has a bore which is provided with at least one plastically deformed guide protrusion on one end and that extends at least partway around the bore. The guide protrusion is stamped into a guide segment of the nozzle holder. The injection valve is especially suited for fuel injection systems of mixture-compressing internal combustion engines with externally supplied ignition.

12 Claims, 5 Drawing Sheets

PLASTICALLY DEFORMED ARMATURE GUIDE PROTRUSIONS

BACKGROUND OF THE INVENTION

The invention is based on an electromagnetically actuatable injection valve as defined hereinafter and to a method for producing a nozzle holder of an injection valve. German Patent 40 26 531.5 discloses an injection valve that has a valve closing member comprising a spherical valve closing body and an armature firmly connected to the valve closing body. The armature cooperates with a winding that is disposed on a core and through which current flows. The valve closing member is guided axially movable in a nozzle body, which is disposed in a nozzle holder bore of a nozzle holder. In the vicinity of the armature, the valve closing member is guided in a guide ring bore of a guide ring acting as an armature guide; the guide ring is disposed on a shoulder of the nozzle holder. The guide ring bore is embodied coaxially with the nozzle holder bore and guides the armature over its entire circumference.

German Offenlegungsschrift 39 25 212.4; U.S. application Ser. No. 508,630 filed Apr. 13, 1990, shows a similar arrangement, in which a valve closing member, comprising a spherical valve closing body, a connecting tube and an armature, is disposed in a nozzle holder bore of a tubular nozzle holder. The armature is guided over its entire circumference in a guide segment of the nozzle holder bore; this segment acts as an armature guide and is embodied coaxially with the nozzle holder bore on the upstream end of the nozzle holder. The guide segment has a smaller diameter than the nozzle holder bore. The connecting tube is firmly joined to the armature at one end and to the valve closing member at the other, so that when the winding has current flowing through it, the valve closing body lifts away from the valve seat face of the nozzle body and uncovers a narrow annular gap between the valve seat face and the valve closing body, through which the fuel flows in the direction of an injection port.

In both of the armature guides described above, guidance of the armature over its entire circumference produces strong frictional forces, because of the large area of contact between the armature and the guide ring or between the armature and the guide segment of the nozzle body bore; this makes fast motion of the valve closing member more difficult. The high frictional forces must be compensated for by using both a stronger restoring spring and a more powerfully dimensioned magnetic circuit.

To assure the axial mobility of the armature, the guide ring bore or the guide segment of the nozzle bore has a slightly larger diameter than the armature, so that in operation the armature can assume an eccentric position in the armature guide. An eccentric position of the armature leads to unilateral contact with the wall of the armature guide, producing a correspondingly larger gap on the opposite side. The uneven gap width over the circumference leads to nonhomogeneity of the magnetic field in the gap between the armature and the armature guide. The lack of homogeneity of the magnet field, and especially the contact of the armature on the armature guide, produce a lateral force toward the wall of the armature guide that increases the frictional forces between the armature and the armature guide still further. Guiding the armature in the guide ring bore or in the guide segment of the nozzle body bore is characterized by a narrow gap between the armature and the wall of the armature guide. This narrow gap seals off a first space, formed between the nozzle holder, the nozzle body and the armature, virtually completely from a second space located on the side of the armature toward the core. Upon each closing or opening movement, the armature is thus working against the volume of the space, which hinders the motion. The volume displacement work of the armature stands in the way of a fast motion of the valve closing member.

Moreover, guiding the armature by a guide ring inserted into the nozzle holder requires high production accuracy, since both the guide ring having the guide ring bore and the shoulder in the nozzle holder into which the guide ring is inserted must be manufactured with maximum accuracy. The use of high-precision production processes increases the effort and cost of production of the injection valve.

OBJECT AND SUMMARY OF THE INVENTION

The injection valve according to the invention as defined hereinafter, and the method of the invention for producing a nozzle holder of an injection valve as defined, have the advantage of especially low-friction guidance of the armature.

The guide protrusions decrease the frictional surface area between the armature and the armature guide, thereby reducing the frictional forces that act to oppose the motion of the armature. With a magnet circuit designed the same as in an injection valve of the prior art, the speed of the closing and opening motion of the injection valve is increased. The injection valve obeys the activation signals of a control unit virtually without delay, and as a result exact metering of the fuel injected by the injection valve is effected. Fuel consumption, engine operation, and engine emissions are all improved.

Compared with an injection valve of the prior art, the area with which the armature rests on the armature guide is reduced by its eccentric position; as a result, the lateral forces acting upon the armature are reduced, which in turn leads to a reduction in the frictional forces between the armature and the armature guide. The throttling action of the gap formed between the armature and the armature guide is reduced compared with a known injection valve, so that upon a closing or opening motion of the injection valve, the volume displacement work to be performed by the valve closing member is reduced, and the speed of the valve closing member motion is increased.

Embodying the guide segment directly on the nozzle holder makes for easily automated manufacture, at favorable cost, of an armature guide in a nozzle holder of an injection valve.

Advantageous features of and improvements to the injection valve and the method for producing its nozzle holder are also defined hereinafter.

Embodying the guide faces of the guide protrusions as flat makes the frictional surface area smaller and thus lessens the frictional force between the armature and the armature guide. The speed of the valve closing member motion is increased.

Opening out the guide segment of the nozzle holder bore, initially produced undersized, to its rated size represents an especially simple, economical method for machining or finishing the armature guide.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
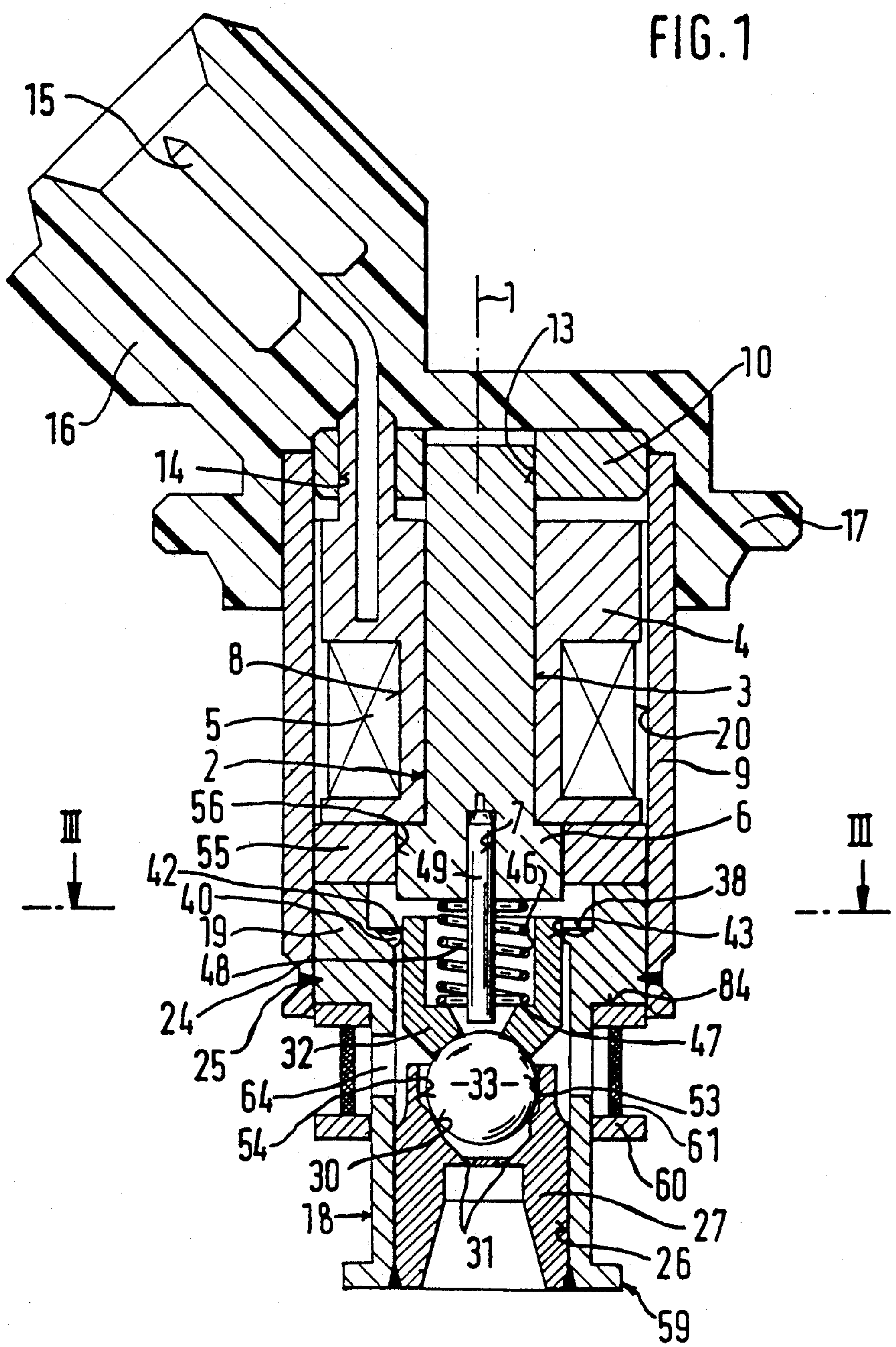
FIG. 1 shows a first exemplary embodiment of an injection valve embodied according to the invention.
Figure 2:
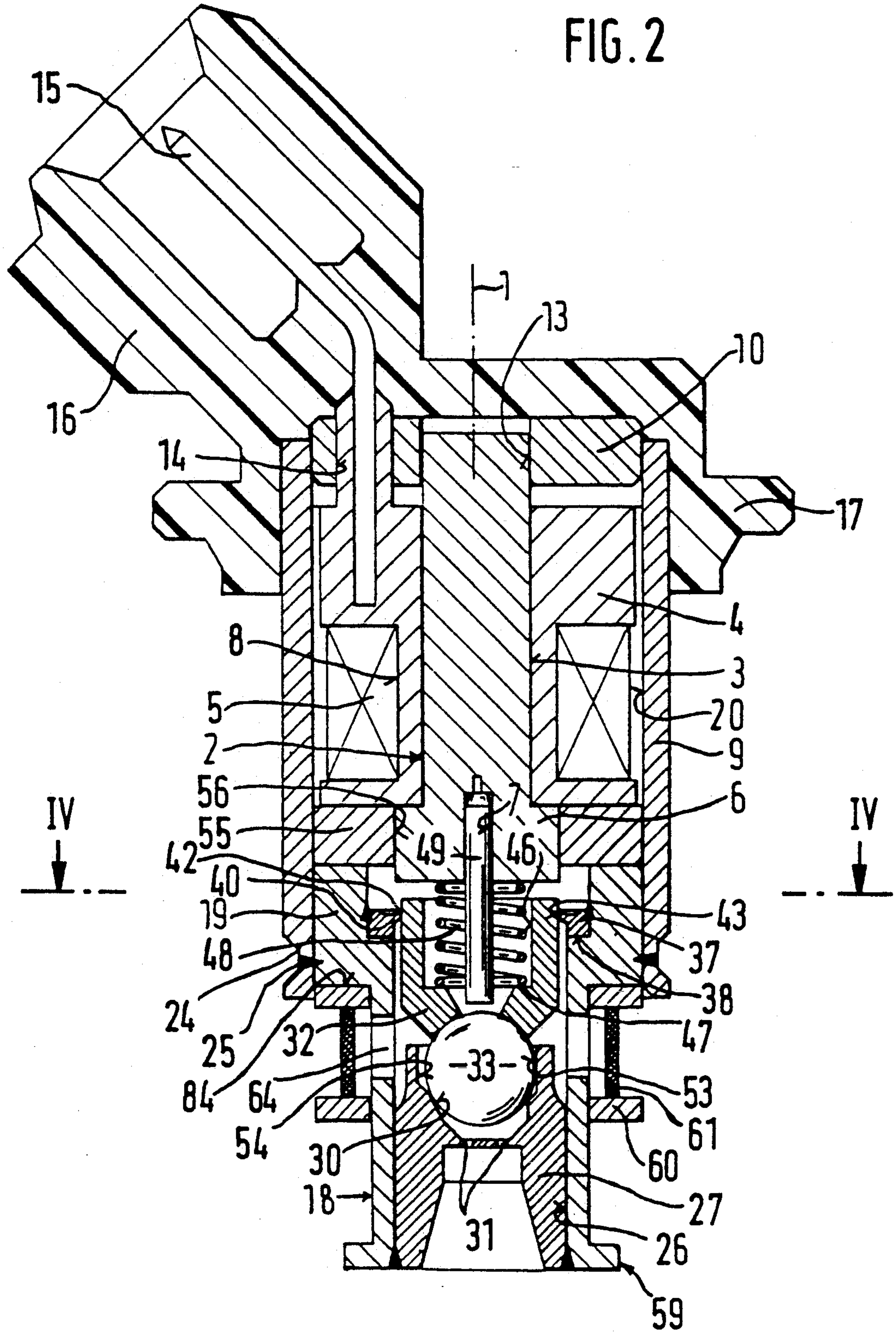
FIG. 2 shows a second exemplary embodiment of an injection valve embodied according to the invention.

The two exemplary embodiments shown in FIGS. 1 and 2 of the drawing for an injection valve in a fuel injection system of a mixture-compressing internal combustion engine with externally supplied ignition differ from one another only slightly, and so components that are identical and have the same function are identified by the same reference numerals.

Concentrically with a longitudinal valve axis 1, the injection valves have an inner pole 2 of a ferromagnetic material, which is stepped, for instance, and which is partly surrounded in a cylindrical coil holder segment 3 by a coil holder 4. A winding 5 is disposed in a radially encompassing recess 8 of the coil holder 4. A flange 6 is formed on one end, remote from the injection, of the inner pole 2; the coil holder 4 rests on this flange, which has a blind bore opening 7 concentrically with the longitudinal valve axis 1.

The winding 5 and the coil holder 4 are surrounded by a valve jacket 9, which extends outward axially past the flange 6 of the inner pole 2. A housing cap 10 in the form of a circular ring is disposed on the end of the inner pole 2 remote from the flange 6, above the coil holder 4, in the radial direction between the inner pole 2 and the valve jacket 9. With a guide opening 13, the housing cap 10 fits around the circumference of the inner pole 2, and it has ducts 14; contact lugs 15 which begin at a electrical connection plug 16 and provide electrical contact for the winding extend through these ducts.

A plastic sheath 17 surrounds at least part of the valve jacket 9 and the face end toward the connection plug 16 of the housing cap 10. The electrical connection plug 16, by way of which electrical contact and hence excitation of the windings 5 takes place, is integrally formed with the plastic sheath 17.

With a flange segment 19 toward the connection, a nozzle holder 18 protrudes into an end remote from the housing cap 10 of a opening 20 of the valve jacket 9 formed concentrically with the longitudinal valve axis 1. The flange segment 19 is firmly joined to the valve jacket 9, for instance by a weld seam 25 extending in a cross-sectional constriction 24 of the vaıve jacket 9. A nozzle body 27 is inserted, remote from the winding 5, into a nozzle holder bore 26 that is embodied concentrically with the longitudinal valve axis 1 and penetrates the nozzle holder 18 longitudinally. The nozzle body 27 is firmly joined to the nozzle holder 18 on its face end remote from the winding 5, for instance by welding. A conical valve seat 30 is formed in the nozzle body 27, and downstream of it, the nozzle body 27 has injection ports 31, for instance two in number.

A tubular armature 32 that cooperates with the pole end of the inner pole 2 remote from the injection protrudes into the nozzle holder bore 26 of the nozzle holder 18. On its end toward the valve seat 30, the armature 32 is directly joined firmly, for instance by welding or soldering, to a spherical valve closing body 33 that cooperates with the valve seat 30.

Figure 3:
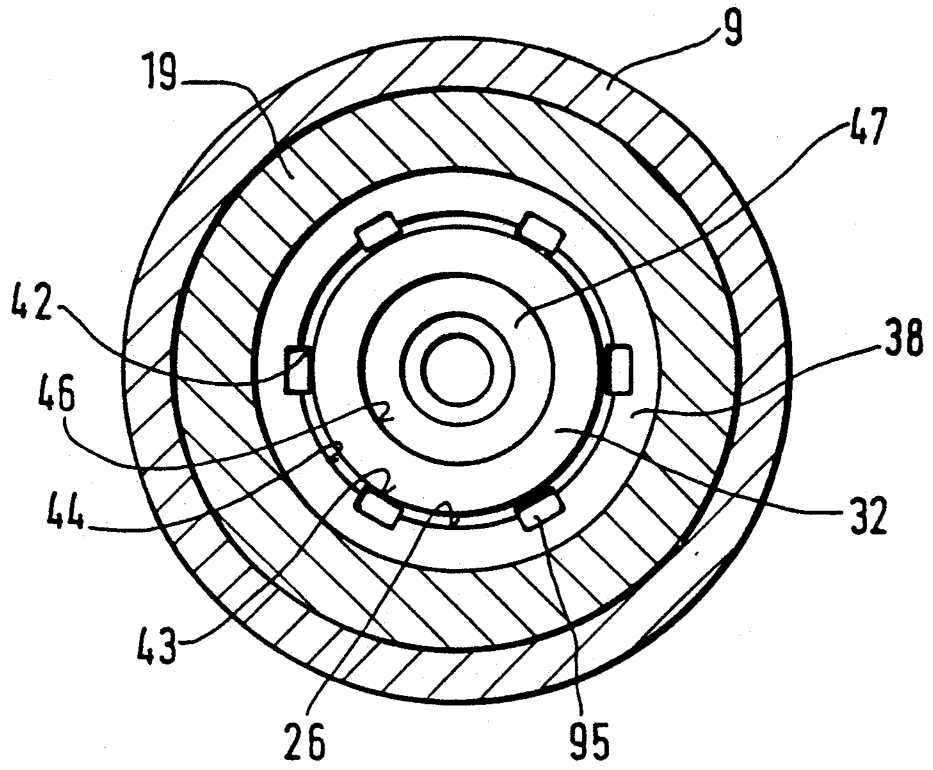
FIG. 3 is a section through the injection valve of FIG. 1 taken along the line III—III.
Figure 4:
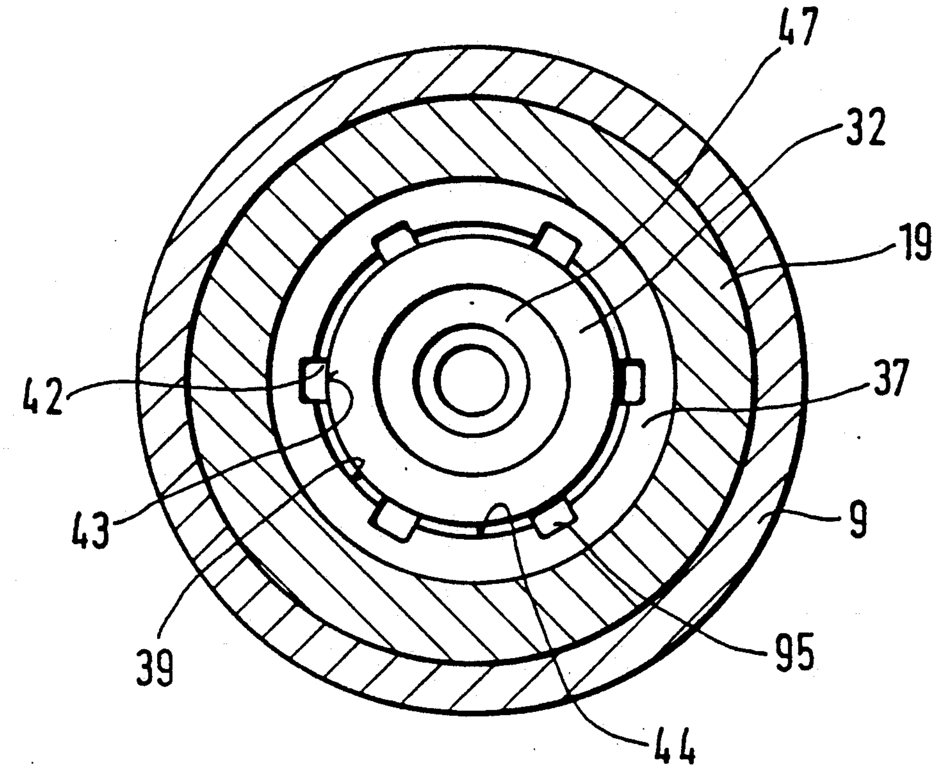
FIG. 4 is a section through the injection valve of FIG. 2 taken along the line IV—IV.

In a first exemplary embodiment in FIG. 1 of the drawing, at least one guide protrusion 42 is provided on the end of the nozzle holder 18 remote from the nozzle body 27, for instance on a step 38 formed thereon, for guiding the movable valve closing member comprising the armature 32 and the valve closing body 33; by way of example, FIG. 3 shows six such guide protrusions 42 distributed uniformly over the circumference of the nozzle holder bore 26, extending at least partway around, and serving to guide the armature. The at least one guide protrusion 42 serves to radially guide the armature 42 and thus the valve closing member, and it protrudes into the nozzle holder bore 26, reducing its cross section. As shown in FIG. 4 of the drawing, one guide face 43 of each guide protrusion 42 is curved, for instance to match the curvature of the wall of the armature 32, or embodied as flat as shown in FIG. 3. A flat embodiment of the guide faces 43, compared with a curved embodiment, makes the friction area smaller and thus lessens the frictional forces between the armature 32 and the guide protrusions 42, thereby increasing the speed of the valve closing member motion. At the same time, recessed faces 44 of the nozzle holder bore 26 located between the guide protrusions 42 enlarge the gap between the armature 32 and the armature guide and thus enable a fluid flow with less loss past the armature 32 which is in motion, so that the volume displacement work that inhibits the armature motion is reduced.

In a second exemplary embodiment in accordance with FIG. 2 of the drawing, a guide ring 37 is disposed in the step 38 of the nozzle holder 18 oriented toward the nozzle body 27, for guiding the movable valve closing member comprising the armature 32 and the valve closing body 33; this guide ring 37 is firmly joined to the stp 38 of the nozzle holder 18, for instance by welding. The guide ring 37 is narrow in the axial direction and has a guide ring bore 39 that is concentric with the longitudinal valve axis 1, passes through the armature 32 with play, and has approximately the same diameter as the nozzle holder bore 26. The guide ring bore 39 has a guide segment 40, toward the inner pole 2, on which at least one guide protrusion 42 is formed; by way of example, FIG. 4 shows six guide protrusions 42, extending at least partway around and distributed uniformly over the circumference of the guide ring bore 39, for guiding the armature 32. The guide faces 43 of the guide protrusions 42 protruding into the guide ring bore 39 may, just as in the first exemplary embodiment, be curved or flat, with the resultant effects described above. At the same time, recessed faces 44 of the guide bore 39 located between the guide protrusions 42 enlarge the gap between the armature 32 and the armature guide and thus enable a fluid flow with less loss past the armature 32 in motion, so that the volume displacement work that inhibits the armature motion is reduced.

In a stepped through bore 46 on its end remote from the inner pole 2, the tubular armature 32 has a spring shoulder 47, on which one end of a restoring spring 48 is supported. With its other end, the restoring spring 48 rests on an end face, toward the armature 32, of the flange 6 of the inner pole 2. The restoring spring 48 acts with a constant, preset spring force upon the armature 32 and thus upon the valve closing body 33. A stop pin 49, which protrudes into the through bore 46 of the armature 32, is disposed in the blind bore opening 7 of the flange 6. In the opening position of the valve, the valve closing body 33 rests on an end face, toward the valve closing body 33, of the stop pin 49, so that the opening stroke of the valve closing body 33 is limited.

The spherical valve closing body 33 is slideably supported in a slide bore 53 formed upstream of the valve seat 30 in the nozzle body 27. The wall of the slide bore 53 is interrupted by flow conduits 54, which enable the axial flow of some medium, such as fuel, from the nozzle holder bore 26 of the nozzle holder 18 to the injection ports 31.

An intermediate ring 55, which is embodied of a nonmagnetic material having a high specific electrical resistance, for instance a ceramic material, is disposed on the side of the coil holder 4 toward the nozzle holder 18, radially between the flange 6 of the inner pole 2 and the valve jacket 9. The intermediate ring 55 is tightly joined, for instance by soldering, on its outer circumference to the opening 20 of the valve jacket 9 and at an intermediate ring opening 56 to the circumference of the flange 6; this lessens the danger that the winding 6 with current flowing through it will come into contact with the medium.

On its injection end, the nozzle holder 18 has a radially outwardly pointing retaining shoulder 59. A carrier ring 60 split into two parts, having a filter element 61 split into two parts, is disposed on the circumference of the nozzle holder 18 between the flange segment 19 and the retaining shoulder 59, so that via the filter element 61, medium from a source, such as a fuel pump, can flow to transverse openings 64, which penetrate the wall of the nozzle holder 18 in such a way that a flow of medium in the direction of the injection ports 31 is possible.

Figure 5:
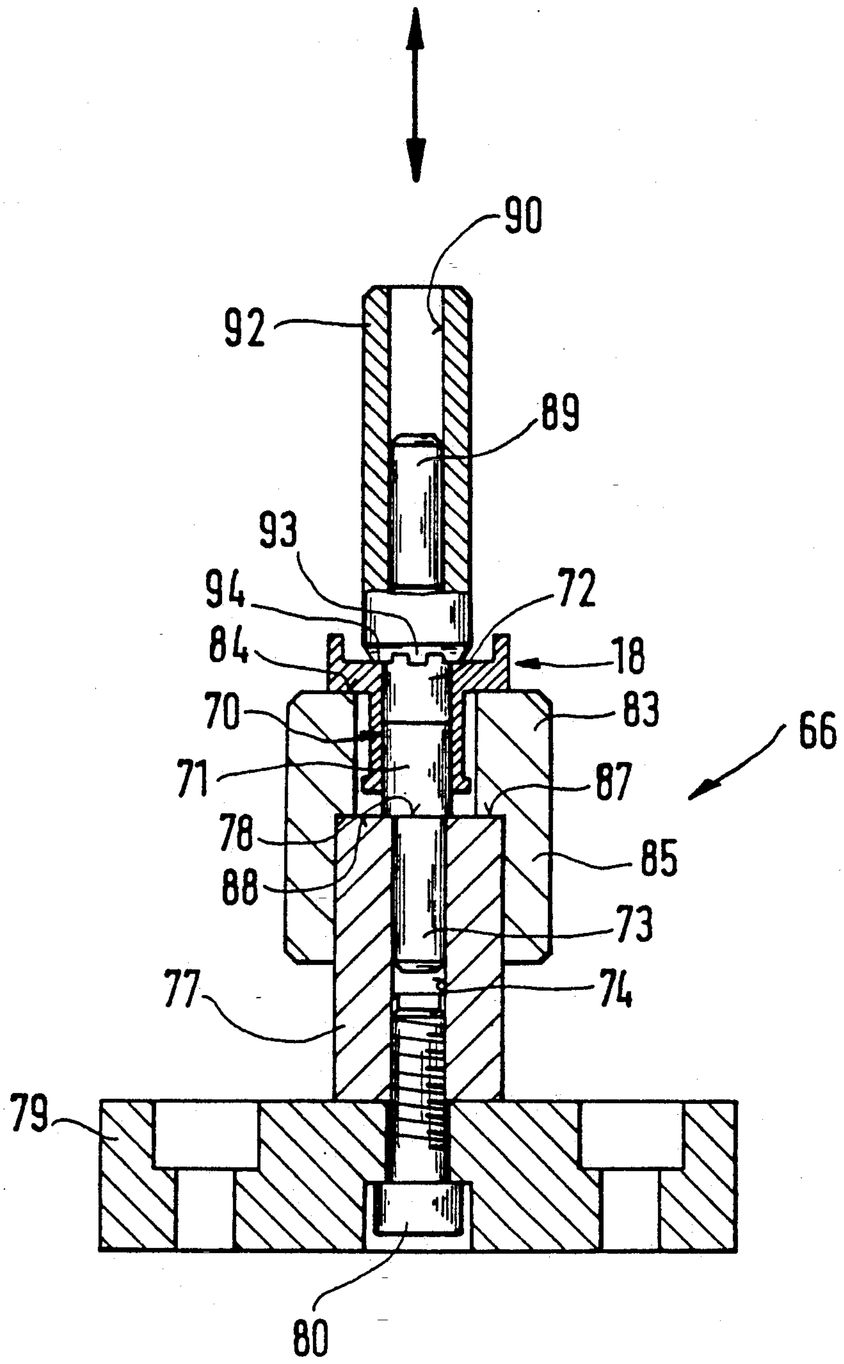
FIG. 5 shows a first exemplary embodiment of a tool for a method according to the invention for producing a nozzle holder of the injection valve of the first exemplary embodiment.

In the first exemplary embodiment, shown in FIG. 1, of the injection valve embodied according to the invention, the armature 32 is guided by guide faces 43 of the guide protrusions 42. The guide protrusions 42 are stamped into the step 38 of the nozzle holder 18 serving as a guide segment 40 by the method described below, using a stamping tool 66 shown in FIG. 5.

The stamping tool 66 has a cylindrical workpiece receptacle 70, which penetrates the nozzle holder bore 26 of a nozzle holder 18 mounted on it. In the segment penetrating the nozzle holder 18, the workpiece receptacle 70 is subdivided into a workpiece guide 71 and a stamping segment 72, which has a smaller diameter than the workpiece guide 71, and with a fastening segment 73 adjoining the workpiece guide 71, it protrudes into a receiving bore 74 of a bolt guide 77. With a shoulder 78 formed by the fastening segment 73 and the workpiece guide 71, the workpiece receptacle 70 is axially supported on a face end 88 of the bolt guide 77 remote from a base plate 79. The bolt guide 77 is anchored in the torsionally rigid base plate 79 by a screw 80. For largely play-free guidance of the nozzle holder 18, the workpiece guide 71 of the workpiece receptacle 70 penetrates the nozzle bore holder 26 with the least possible radial play. A workpiece support 83 grips the nozzle holder 18 over at least part of its outer circumference. Axially, the nozzle holder 18 is supported by a shoulder 84 on a face end of the workpiece support 83 remote from the base plate 79. For its radial guidance, the workpiece support 83 fits partway, with a receiving segment 85, around the bolt guide 77 and is axially supported by a shoulder 87 on the face end 88 of the bolt guide 77 remote from the base plate 79.

The stamping segment 72 of the workpiece receptacle 70 is adjoined by a die guide 89, which is for instance cylindrical. A stamping die 92 is mounted on the die guide 89 in such a way that the die guide 89 protrudes with slight radial spacing into a guide bore 90 of the stamping die 92 and guides it axially displaceably with as little play as possible. The stamping die 92 is moved by an eccentric drive mechanism, for example, not shown. Toward the nozzle holder 18, the stamping die 92 has a number of pronglike, conical stamping edges 93 corresponding to the number of guide protrusions 42 and distributed over the circumference of the stamping die 92.

By means of a motion of the stamping die 92 in the direction of the nozzle holder 18, an axial force is introduced into the nozzle holder 18 at the points where the at least one stamping edge 93 touches the nozzle holder 18; because of the fixed position of the nozzle holder 18, this causes a plastic deformation of the material of the guide segment 40 of the nozzle holder 18 in the region of contact points 94 between the at least one stamping edge 93 and the nozzle holder 18. The plastically deformed material of the nozzle holder 18 is deflected by the at least one stamping edge 93 in the direction of the stamping segment 72 of the workpiece receptacle 70 until it touches the latter and thus forms the at least one guide protrusion 42. Thus, the diameter of the stamping segment 72 determines how far the at least one guide protrusion 42 protrudes into the nozzle holder bore 26. When the stamping process is completed, the nozzle holder 18 has a number of indentations 95, whose form substantially matches the cross section of the stamping edges 93, and which correspond in number to the stamping edges 93 located in the region of contact points 94 between the at least one stamping edge 93 and the nozzle holder 18.

By selecting various workpiece receptacles 70 with various diameters or contours of the stamping segment 72, nozzle holders 18 that fit armatures of various diameters can be produced. The contour—curved or flat—of the guide faces is specified by the shape of the stamping segment 72. With a hexagonal stamping segment 72, for instance and a corresponding number of stamping edges 93, nozzle holders 18 with six guide protrusions 42, distributed uniformly over the circumference for instance, and having flat guide faces 43, can be made.

By using a stamping die 92 that has only a single stamping edge 93 running around the entire circumference of the stamping die 92, however, it is also possible to produce a nozzle holder 18 that has a single guide protrusion 42, running around the entire circumference of the nozzle holder bore 26, to guide the armature 32 over its entire circumference.

Figure 6:
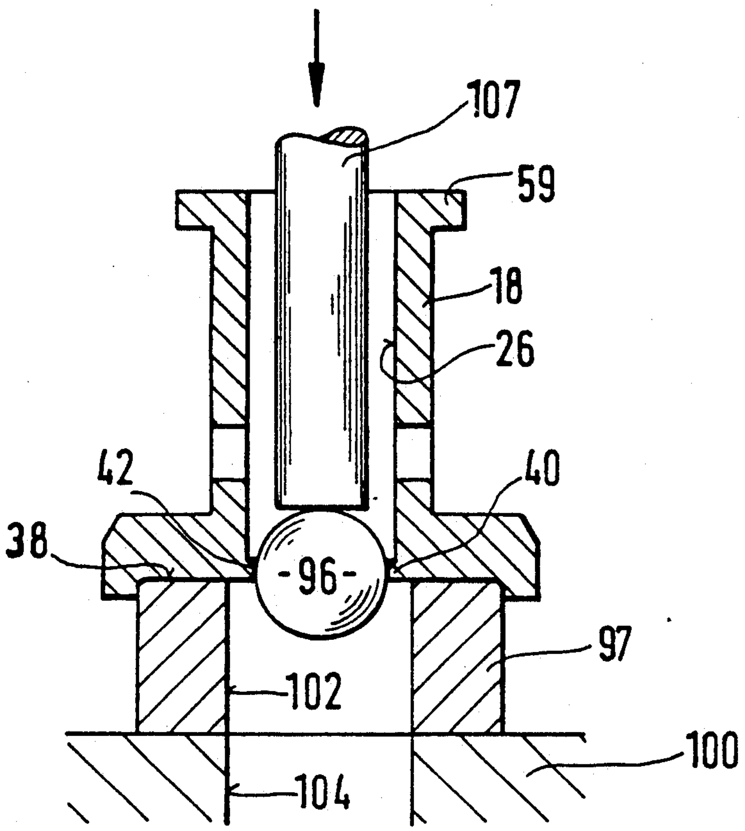
FIG. 6 shows a second exemplary embodiment of a tool for a method according to the invention for producing a nozzle holder of the injection valve of the first exemplary embodiment.

In the method shown in FIG. 6 for producing a nozzle holder 18 of an injection valve, and in particular an injection valve of FIG. 1, for instance having one guide protrusion 42 extending around the entire circumference of the nozzle holder bore 26, the guide segment 40 of the nozzle holder 18 is enlarged to a rated size by pressing at least one calibrated ball 96 through it. Before this operation, the diameter of the guide segment 40 of the nozzle holder 18 is less than that of the armature 32, so that the armature cannot be inserted into the nozzle holder bore 26. The guide segment 40, initially produced undersized, is finished by stamping or in other words plastic deformation of the step 38 by the method described above, using a stamping die 92 that has a single encompassing stamping edge 93. The method shown in FIG. 6 is especially suitable for post-machining of the guide segment 40 or for enlarging it to a rated diameter that fits a different armature 32.

To carry out the method, the nozzle holder 18 with the step 38 is mounted on an annular nozzle holder retainer 97. The step 38 fits around the nozzle holder retainer 97 with the least possible radial play, so that the nozzle holder 18 is axially and radially guided. The nozzle holder retainer 97 is firmly joined to a base plate 100. A second bore 104 is disposed in the base plate 100, coaxially with a first bore 102 in the nozzle holder retainer 97. The first and second bores 102, 104 have a larger diameter than the ball 96, so that the ball is pressed through the nozzle holder 18 from the direction of the retaining shoulder 59 and can be removed through the bores 102, 104 of the nozzle holder retainer 97 and of the base plate 100, respectively.

To open out the nozzle holder bore 26 to its rated size, at least one calibrated ball 96 is pressed at least once from the direction of the retaining shoulder 59 in the direction of the guide segment 40 through the nozzle holder bore 26 of the nozzle holder 18. In this process, the nozzle holder 18 is plastically deformed in the region of the guide segment 40 in such a way that after the ball 96 has been pressed through it, it has approximately the same diameter as the ball. Plastic or elastic deformations of the ball 96 as it is pressed through the nozzle holder bore 26 must be avoided as much as possible, for instance by means of a suitable selection of material or by a suitable surface treatment. The ball 96 is acted upon in the direction of the arrow by a rod 107, which transmits the force necessary for the opening out process to the ball 96. The rod 107 is driven by an eccentric, for example, in a manner not shown.

To achieve guidance of the armature 32 in the guide segment 40 of the nozzle holder 18 with as little play as possible, a ball 96 that fits the diameter of the armature 32 is selected from an assortment of a plurality of balls, with graduated diameters differing from one another by 5 μm, for instance, so that once the applicable ball 96 has been pressed through the nozzle holder 18, the guide segment 40 of the nozzle holder has a diameter that assures guidance of the armature 32 in the nozzle holder 18 with as little play as possible. To determine the optimal diameter of the ball 96, the diameter of each armature 32 is ascertained, for instance with a dial gauge, and a ball 96 that fits that armature diameter is selected. In this way, tolerances in the armature diameter can be largely compensated for.

Figure 7:
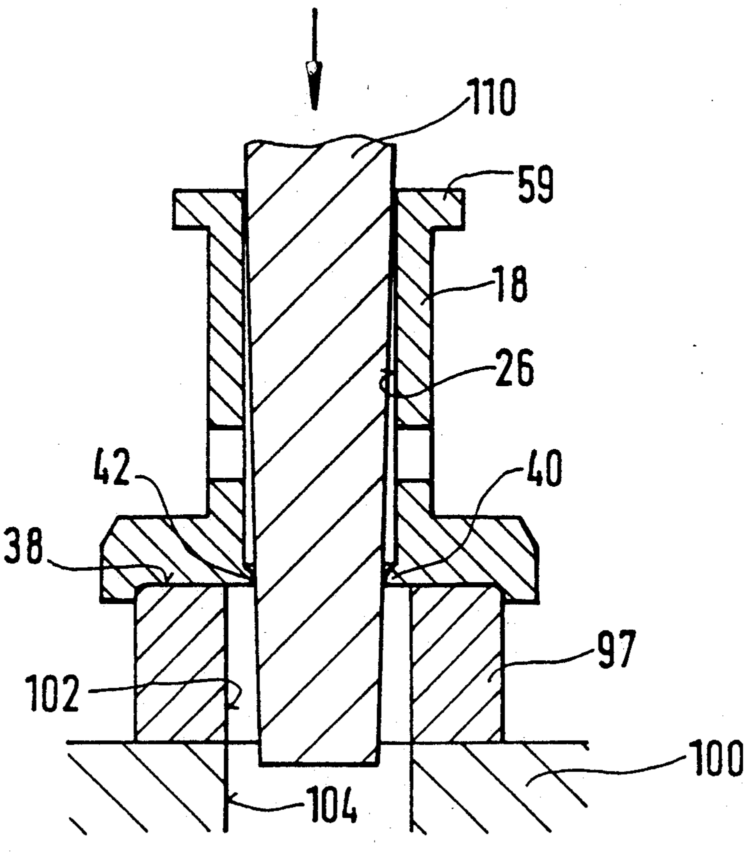
FIG. 7 shows a third exemplary embodiment of a tool for a method according to the invention for producing a nozzle holder of the injection valve of the first exemplary embodiment.

Instead of opening out the diameter of the guide segment 40 of the nozzle holder 18 to its rated size by means of balls, the possibility also exists, as shown in FIG. 7, of opening out the diameter, initially manufactured undersized, of the guide segment 40 to a rated size by means of a conically embodied mandrel 110 The undersized guide segment 40 is produced by way of example by stamping as described above. The nozzle holder 18 is fixed on the nozzle holder retainer 97 in the manner described above. By its slenderer end, the mandrel 110 is introduced from the direction of the retaining shoulder 59 into the nozzle holder bore 26 of the nozzle holder 18. The diameter of the guide segment 40 is opened out as a function of the depth to which the mandrel 110 is inserted into the nozzle holder bore 26. In this process, the nozzle holder 18 is plastically deformed in the region of the guide segment 40 in such a way that after the mandrel 110 has been introduced, it has the diameter of the mandrel at the applicable point. Plastic and/or elastic deformations of the mandrel 110 upon opening out of the nozzle holder bore 26 must be avoided as much as possible, by means of a suitable selection of material or a suitable surface treatment.

The depth to which the mandrel 110 is pressed-in is controlled as a function of the diameter of the particular armature 32 to be installed in the applicable nozzle holder 18, thereby enabling a largely play-free guidance of the armature 32 in the nozzle holder 18 in a manner that compensates for tolerances in armature diameter. The slope of the conical mandrel 110, the diameter of the nozzle holder bore 26, the depth to which the mandrel 110 is pressed in, and the rated size of the guide protrusions 42 of the guide segments 40 must be adapted to one another in such a way that the mandrel 110 opens out the nozzle holder bore 26 only in the region of the guide segment 40. By way of example, the mandrel 110 is driven by a hydraulic press, not shown.

The foregoing relates to preferred exemplary embodiments of the invention it being understood that other variants and embodiments thereof are possible within the spirit and scope of the invention, the latter being defined by the appended claims.

What is claimed and desired to be secured by Letters Patent of the United States is:

1. An electromagnetically actuatable injection valve for fuel injection systems in internal combustion engines, having a nozzle holder, a coil winding disposed on a core, an armature, a nozzle body joined to the nozzle holder and including a valve seat, and a valve closing body joined to the armature and cooperating with the vale seat, said armature being radially guided and axially movably supported by at least one guide protrusion of a guide segment of the nozzle holder, said at least one guide protrusion protruding into a nozzle holder bore and being plastically deformed on one end thereof which extends at least partway around the guide segment of the nozzle holder bore.

2. An electromagnetically actuatable injection valve for fuel injection systems in internal combustion engines, having a nozzle holder, a coil winding disposed on a core, an armature, a nozzle body joined to the nozzle holder and including a valve seat, and a valve closing body joined to the armature and cooperating with the valve seat, said armature being radially guided and axially movably supported by means of a guide ring including a guide ring bore, said guide ring being disposed in the nozzle holder and including a guide segment having at least one plastically deformed guide protrusion extending at least partway around one end thereof and protruding into the guide ring bore, for guiding the armature.

3. An injection valve as defined by claim 1, in which the at least one guide protrusion (42) has a curved guide face (43).

4. An injection valve as defined by claim 2, in which the at least one guide protrusion (42) has a curved guide face (43).

5. An injection valve as defined by claim 1, in which the at least one guide protrusion (42) has a flat guide face (43).

6. An injection valve as defined by claim 2, in which the at least one guide protrusion (42) has a flat guide face (43).

7. An injection valve as defined by claim 1, in which the at least on guide protrusion (42) is manufactured by stamping.

8. An injection valve as defined by claim 2, in which the at least one guide protrusion (42) is manufactured by stamping.

9. An injection valve as defined by claim 3, in which the at least one guide protrusion (42) is manufactured by stamping.

10. An injection valve as defined by claim 4, in which the at least one guide protrusion (42) is manufactured by stamping.

11. An injection valve as defined by claim 5, in which the at least one guide protrusion (42) is manufactured by stamping.

12. An injection valve as defined by claim 6, in which the at least one guide protrusion (42) is manufactured by stamping.

* * * * *